(12) United States Patent
Stoof et al.

(10) Patent No.: US 10,337,227 B2
(45) Date of Patent: Jul. 2, 2019

(54) REAR ACCESS DOOR LATCH AND SEALING SYSTEMS

(71) Applicant: MAGNA CLOSURES INC., Newmarket (CA)

(72) Inventors: Frank Stoof, Keswick (CA); Kris Tomaszewski, Newmarket (CA); Roman Cetnar, Newmarket (CA); Kurt M. Schatz, Uxbridge (CA); Peter Lance Oxley, Mount Albert (CA); James J. Ferri, Maple (CA); Jeffrey Richard F. Domenchini, Etobicoke (CA); Joseph Scheuring, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 129 days.

(21) Appl. No.: 15/438,836

(22) Filed: Feb. 22, 2017

(65) Prior Publication Data

US 2017/0254132 A1 Sep. 7, 2017

Related U.S. Application Data

(60) Provisional application No. 62/303,082, filed on Mar. 3, 2016.

(51) Int. Cl.
| | |
|---|---|
| *E05D 15/58* | (2006.01) |
| *B60J 10/86* | (2016.01) |
| *B60J 5/04* | (2006.01) |
| *E05D 3/12* | (2006.01) |
| *E05B 83/38* | (2014.01) |

(Continued)

(52) U.S. Cl.
CPC ............ *E05D 15/58* (2013.01); *B60J 5/0479* (2013.01); *B60J 10/40* (2016.02); *E05B 83/38* (2013.01); *E05D 3/127* (2013.01); *B60J 10/86* (2016.02); *E05D 2015/485* (2013.01); *E05D 2015/586* (2013.01); *E05Y 2900/531* (2013.01)

(58) Field of Classification Search
CPC ... E05D 15/58; E05D 3/127; E05D 2015/485; E05D 2015/586; B60J 10/86; B60J 5/0479; E05B 83/38; E05Y 2900/531
See application file for complete search history.

(56) References Cited

U.S. PATENT DOCUMENTS

| | | | |
|---|---|---|---|
| 7,488,029 B2 * | 2/2009 | Lechkun | B60J 5/0479 296/146.1 |
| 8,328,268 B2 * | 12/2012 | Charnesky | B60J 5/0479 277/644 |

* cited by examiner

*Primary Examiner* — D Glenn Dayoan
*Assistant Examiner* — Melissa A Black
(74) *Attorney, Agent, or Firm* — Dickinson Wright PLLC (57) ABSTRACT

The present disclosure generally relates to a two-door closure system for a motor vehicle including a body having an A-pillar and a C-pillar being spaced from one another. According to an aspect of the disclosure, the closure system includes a front door having a front edge that is pivotably connected to the A-pillar. The closure system also includes a rear door that has a rearward edge that is pivotably coupled to the C-pillar of the vehicle body. At least one swivel hinge unit is provided that has a first pivot pin that is pivotably connected to the rearward edge of the rear door, and a second pivot pin for being pivotably connected to the C-pillar of the vehicle body to allow the rear door to initially pivot and translate away from the front door prior to pivoting the rear door between an open and closed position about the second pivot pin.

18 Claims, 6 Drawing Sheets

(51) Int. Cl.
*B60J 10/40* (2016.01)
*E05D 15/48* (2006.01)

REAR ACCESS DOOR LATCH AND SEALING SYSTEMS

CROSS REFERENCE TO RELATED APPLICATIONS

This application claims the benefit of U.S. Provisional Patent Application Ser. No. 62/303,082 filed on Mar. 3, 2016, and titled "REAR ACCESS DOOR LATCH AND SEALING SYSTEMS", the entire disclosure of which is hereby incorporated by reference.

TECHNICAL FIELD

The present disclosure relates generally to closure systems for motor vehicles. More particularly, the present disclosure relates to a door latching and sealing arrangement associated with a rear access door.

BACKGROUND

This section provides background information related to the present disclosure which is not necessarily prior art.

Many pick-up trucks include a passenger cabin configured to provide a row of rear seats located behind a row of front seats to accommodate additional passengers. These pick-up trucks having such an extended passenger cabin typically include a front door to provide access to the front seats and a rear door to provide access to the rear seats. The rear door, commonly referred to as a rear access door, also provides convenient access to the space behind the front seats during loading and unloading of items. In some pick-up trucks, the front and rear doors are mounted side-by-side and both open by pivoting away from each other (i.e., the hinges are on the sides opposite from the opposed doors, an arrangement sometimes referred to as a "clamshell" design). This arrangement is typically configured where the front door pivots forward and the smaller rear access door pivots backwards, with no B-pillar provided in the vehicle body between the two doors.

Typically, such two door extended cab arrangements require a gap between the two doors in order to allow them to swing between their open and closed positions without hitting each other. This gap, however, needs to be sealed to prevent water and noise from entering the vehicle while the doors are closed, particularly since there is no B-pillar structure to seal each door against. In other two door extended cab arrangements, the front door overlaps the rear door to provide a more traditional sealing arrangement. However, the front door must be opened prior to release of the rear door to avoid movement interference therebetween. In addition, to these sealing requirements, each door must be latched with respect to the vehicle body in the closed position, with conventional mechanical and power-operated latches commonly used for such two-door arrangements.

Thus, a need exists to develop alternative latching and sealing arrangements for such two-door closure systems that advance the art and provide enhanced convenience to the vehicle passengers.

SUMMARY

This section provides a general summary of the disclosure, and is not a comprehensive disclosure of its full scope or all of its features.

It is an aspect of the present disclosure to provide a two-door closure system for a motor vehicle, particularly, a pick-up type of motor vehicle, having a front door configured to swing about fixed front hinge pivots in a forward direction to its open position and a rear door configured to pivot about swivel-type rear hinge pivots prior to swinging in a rearward direction to its open position. In this arrangement, the rear hinge pivots include a pivot link having a first end pivotably mounted to the vehicle body and a second end pivotably mounted to an edge of the rear door. Pivotal movement of the rear swivel-type hinge system functions to pivot and rearwardly translate the rear door to a position free of interference with the front door prior to swinging movement of the rear door between its open and closed positions.

It is another aspect of the present disclosure to provide a further two-door closure system for a motor vehicle including a body having an A-pillar and a C-pillar being spaced from one another. The two-door closure system includes a front door having a front edge for being pivotably connected to the A-pillar of the vehicle body, and a rear edge positioned in spaced and generally parallel relationship with the front edge. The closure system also includes a rear door that has a rearward edge for being pivotably coupled to the C-pillar of the vehicle body, and a forward edge disposed in spaced and generally parallel relationship with the rearward edge. At least one swivel hinge unit is provided that has a first pivot pin that is pivotably connected to the rearward edge of the rear door, and a second pivot pin for being pivotably connected to the C-pillar of the vehicle body to allow the rear door to initially pivot and translate away from the front door prior to pivoting the rear door between an open and closed position about the second pivot pin.

It is another aspect of the present disclosure to provide a further two-door closure system for a motor vehicle. The two-door closure system includes an A-pillar and a C-pillar positioned in spaced and generally parallel relationship with one another. The closure system also includes a front door that has a front edge pivotably connected to the A-pillar, and a rear edge positioned in spaced and generally parallel relationship with the front edge. The closure system further includes a rear door having a forward edge facing the rear edge of front door and a rearward edge pivotably coupled to the C-pillar and disposed in spaced and generally parallel relationship with the front edge. The rearward edge of the rear door is pivotably coupled to the C-pillar via at least one swivel hinge unit configured to initially pivot and translate the rear door away from the front door prior to pivoting the rear door between an open and closed position.

It is another aspect of the present disclosure to provide a further two-door closure system for a motor vehicle including a body having an A-pillar and a C-pillar being spaced from one another. The two-door closure system includes a front door having a front edge for being pivotably connected to the A-pillar of the vehicle body, and a rear edge positioned in spaced and generally parallel relationship with the front edge. The closure system further includes a rear door having a rearward edge for being pivotably coupled to the C-pillar of the vehicle body, and a forward edge positioned in spaced and generally parallel relationship with the forward edge. A pocket seal is mounted to one of the rear edge of the front door and the forward edge of the rear door. A sealing panel is mounted to the other of the rear edge of the front door and the forward edge of the rear door and is moveable between a retracted position and an engaged position, wherein the sealing panel is spaced from the pocket seal when in the retracted position, and wherein the sealing panel is received by the pocket seal when in the engaged position.

It is another aspect of the present disclosure to provide a further two-door closure system for a motor vehicle, particularly a pick-up truck, having a common body-mounted latch assembly used for latching both of the front and rear doors in a closed position.

It is a further aspect to provide an alternative sealing arrangement including at least one spring-loaded sealing member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
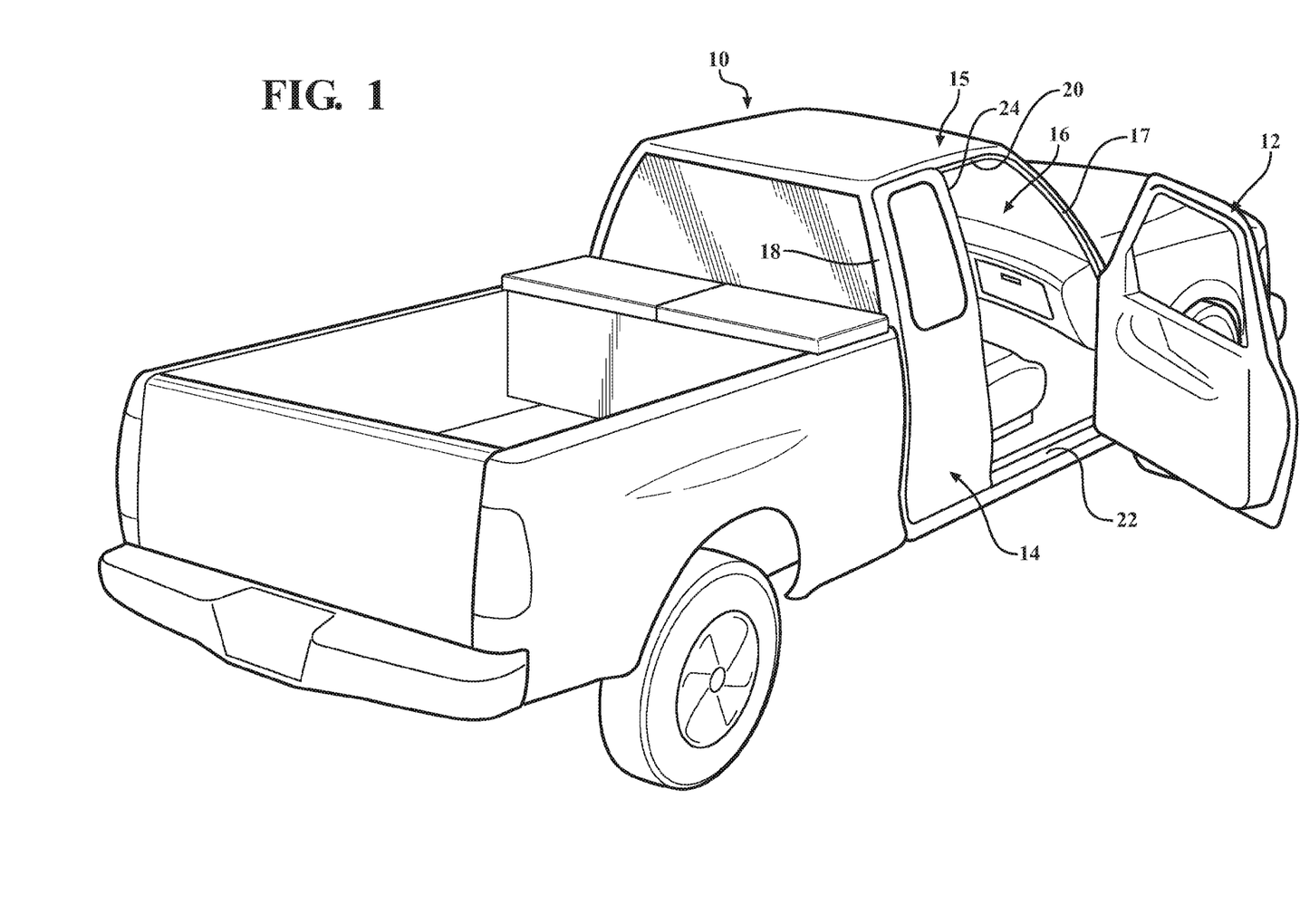
FIG. 1 is a perspective view of an example pick-up truck equipped with a two-door closure system embodying the fasteners and aspects of the present disclosure.

Referring to FIG. 1, a motor vehicle 10 includes a pair of front doors 12 (driver side and passenger side) and a pair of rear access doors 14 (driver side and passenger side) directly rearward of front door 12 for providing access to a passenger compartment or cabin 16. In the embodiment shown, motor vehicle 10 is a pick-up truck. Front door 12 is mounted to a body structure 15 of vehicle 10 via a pair of front hinge pivots (not shown) along an A-pillar 17. Rear doors 14 are mounted to body structure 15 of vehicle 10 via a pair of rear hinge pivots (not shown) along a C-pillar 18 that is positioned in spaced and generally parallel relationship with a lower portion of the A-pillar 17. Front doors 12 and rear doors 14 pivot in opposite directions thereby eliminating the need for a central B-pillar in body structure 15 between A-pillar 17 and C-pillar 18. This ability for the doors 12, 14 to pivot in opposite directions allows occupants of vehicle 10 to comfortably enter cabin 16. A portion of the facing edges on both of the front door 12 and rear door 14 are aligned along a vertically-extending sealing interface when both doors are closed. A-pillar 17 and C-pillar 18 are interconnected via a top rail edge 20 and a lower rail edge 22 to define a continuous side opening for providing access to cabin 16. As will be detailed, front door 12 and rear door 14 define a two-door closure system embodying the present disclosure. One or more examples of a latching system and a sealing system associated with the two-door closure system of the present disclosure will now be detailed.

Figure 2:
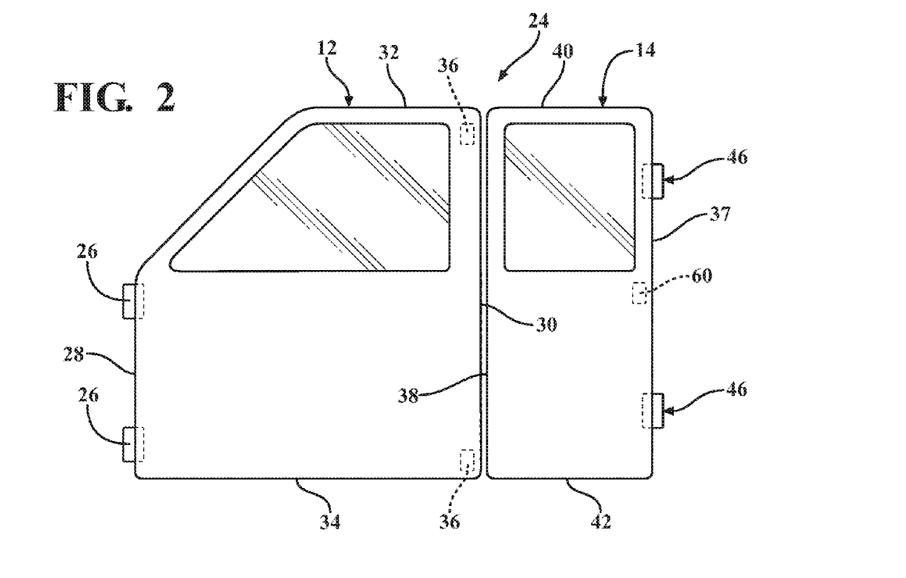
FIG. 2 is a side view of a two-door closure system for use with the motor vehicle of FIG. 1 and constructed in accordance with a first embodiment of the present disclosure.
Figure 3A:
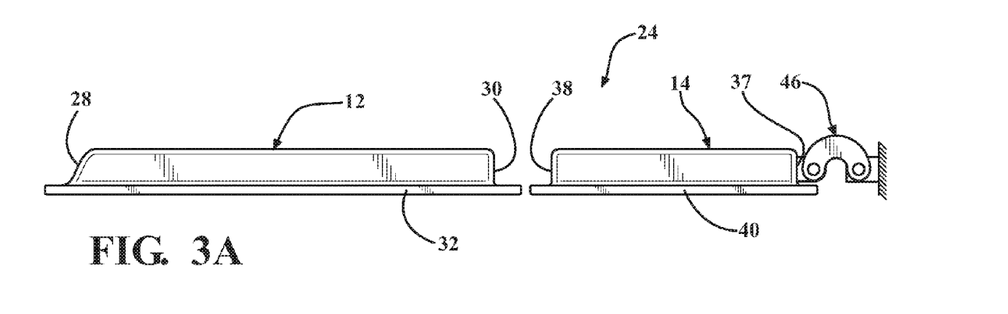
FIGS. 3A through 3C illustrate top edge views of the two-door closure system of FIG. 2 for showing the movement of the rear door relative to the front door between a closed and latched position and an open position.
Figure 3B:
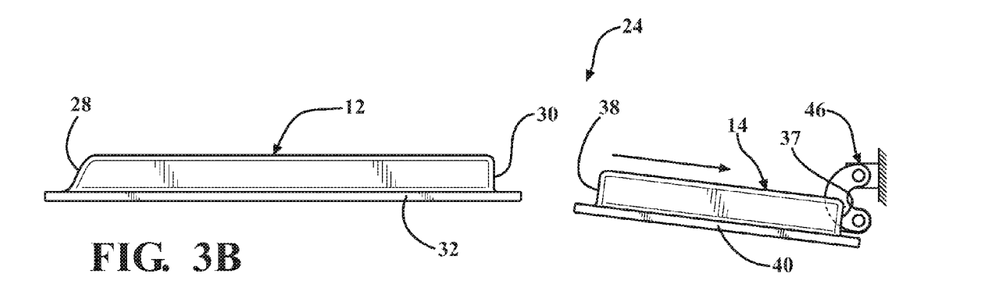
Figure 3C:
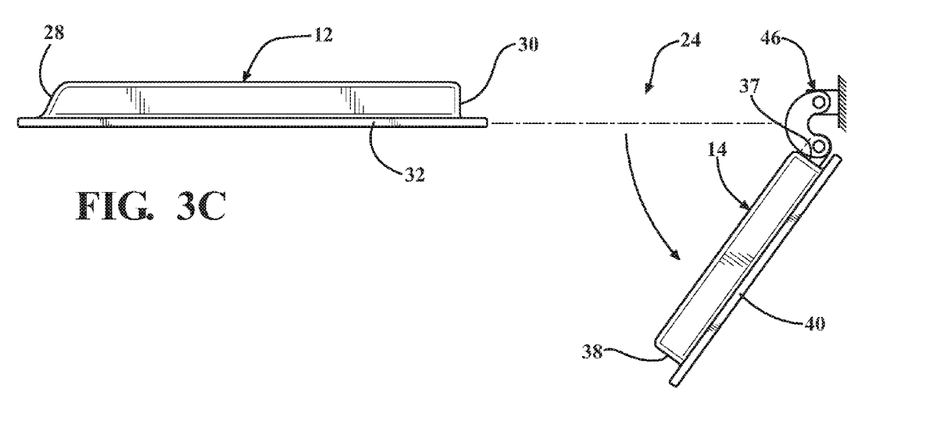
Figure 4A:
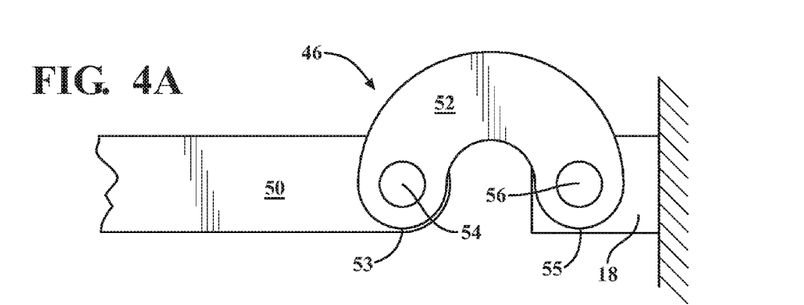
FIGS. 4A and 4B illustrate the operative positions of components associated with a swivel-hinge assembly used with the rear door to provide the range of movement shown in FIGS. 3A-3C.
Figure 4B:
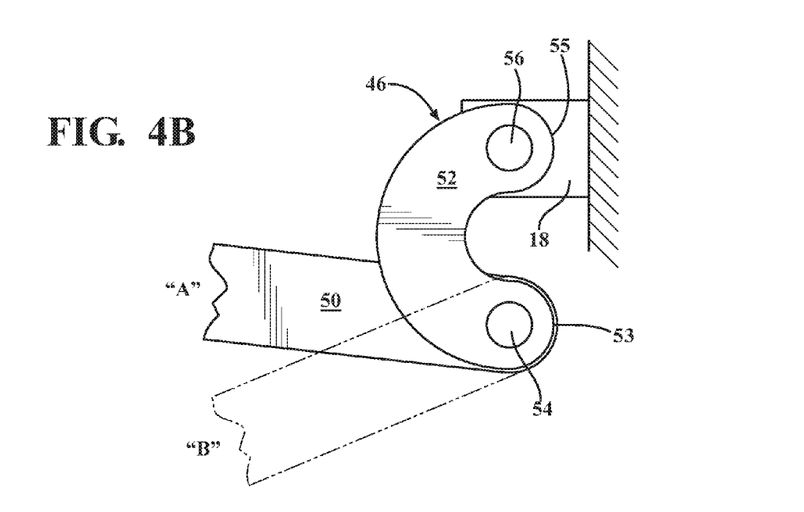

Referring to FIGS. 2 through 4, a two-door closure system 24 is shown to include front door 12 and rear door 14. Front door 12 includes a pair of door hinge straps 26 configured to be pivotably coupled to a pair of body hinge straps (not shown) mounted to A-pillar 17 to permit front door 12 to pivot around a pair of fixed front hinge pivots. Front door 12 pivots forwardly (toward A-pillar 17) from the closed position shown in FIGS. 2 and 3A-3C to its open position to permit access to the front seat portion of cabin 16. Front door 12 includes a front hinge edge 28 and a rear latching edge 30 that are bounded by an upper edge 32 and a lower edge 34. The front and rear edges 28, 30 are positioned in spaced and generally parallel relationship with one another. A pair of upper and lower latches 36 are configured, in this non-limiting example, to releaseably engage strikers (not shown) fixed to upper rail 20 and lower rail 22 of vehicle body 15. Any suitable latches 36 can be used with mechanical actuation, electrical actuation, remote actuation or a combination thereof.

Rear door 14 is shown to include a rearward edge 37 and a forward sealing edge 38 interconnected by a top edge 40 and a bottom edge 42. The rearward and forward edges 37, 38 are positioned in spaced and generally parallel relationship with one another. As seen in FIGS. 2 and 3A, forward sealing edge 38 of rear door 14 is configured to be aligned with and in close proximity to rear latching edge 30 of front door 12 when the doors are closed. Optionally, front door 12 can overlie rear door 14 such that the forward sealing edge 38 of rear door 14 is behind rear latching edge 30 of front door 12. A pair of swivel hinge units 46 are shown schematically in FIG. 2 and are configured to pivotably couple rearward edge 37 to C-pillar 18. It should be appreciated that the swivel hinge units 46 could similarly be utilized to connect the front door 12 to A pillar 17. The swivel hinge units are positioned in spaced relationship with one another along the rearward edge 37. FIGS. 4A-4C illustrate hinge units 46 to include a first pivot component 50 fixed to rearward edge 37 of rear door 14 and a second pivot component 52 fixed to C-pillar section 18 of vehicle body 15. The second pivot component 52 extends in an arc-shape between a first terminal end 53 and a second terminal end 55. An end of first pivot component 50 is pivotably coupled via a first pivot pin 54 to the first terminal end 53 of second pivot component 52. Additionally, the second terminal end 55 of second pivot component 52 is pivotably coupled via a second pivot pin 56 to C-pillar 18. The first and second pivot pins 54, 56 are oriented substantially parallel to the rearward edge 37 of the rear door 14. The second pivot component 50 may extend along a plane being generally perpendicular to the first and second pivot pins 54, 56.

FIG. 4A illustrates the orientation of swivel units 46 when rear door 14 is closed. In contrast, FIG. 4B illustrates the orientation of the components of swivel units 46 when rear door 14 is opened. What is shown is that rearward edge 37 of rear door 14 initially pivots about first and second pivot pins 54, 56 outwardly from vehicle body 15 and slides/translates rearwardly (FIG. 3B) until swivel units 46 are located as shown in FIG. 4B. Thereafter, rear door 14 pivots about first pivot pin 54 from the retracted/closed position "A" and FIG. 3B into the retracted/open position "B" and FIG. 3C to provide access to the rear portion of cabin 16.

As best illustrated in FIG. 2, rear door 14 has a single latch 60 located in proximity to rearward edge 37 for releaseably latching rear door 14 to C-pillar 18. While not shown, upper and lower spring-loaded guide pins adjacent to forward sealing edge 38 of rear door 14 are provided and are operable to be releaseably insertable into body latching apertures (not shown) associated with upper and lower rails 20 and 22 to latch rear door 14 in its closed position. Swivel hinge units 46 provide a first stage and a second stage of operation. The first stage (after release of latch 60) causes rear portion of door 14 to swing out and around pivot 56. The second stage allows swinging mount of rear door 14 between its open and closed positions.

Figure 5:
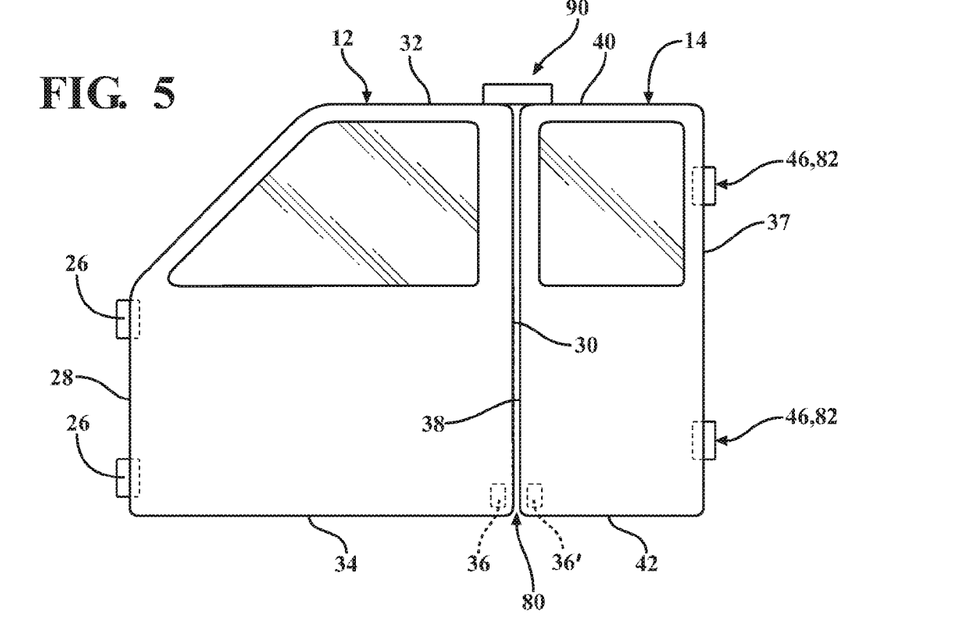
FIG. 5 is a side view of a two-door closure system for use with the motor vehicle of FIG. 1 constructed in accordance with a second embodiment of the present disclosure.
Figure 6:
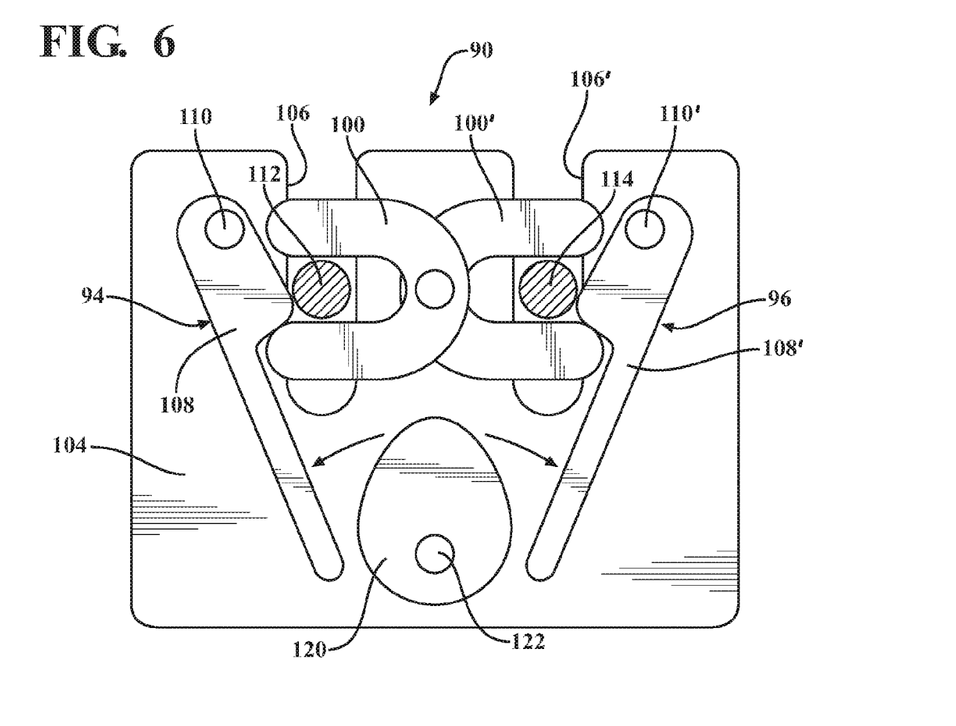
FIG. 6 is a side view of a body-mounted latch assembly associated with the two-door closure system of FIG. 5.

Referring now to FIGS. 5 and 6, another embodiment of a two-door closure system 80 is shown to include front door 12 and rear door 14.

Closure system 80 can be equipped with swivel pivot units 46 of FIGS. 4A-4B to provide door movement shown in FIGS. 3A-3C or can be fixed pivot hinges 82 pivotably connected to C-pillar 18 of vehicle body 15. Closure system 80 is shown with front door 12 including a lower door-mounted latch 36 adapted to engage a striker (not shown) mounted to lower rail 22. Similarly, rear door 14 is now shown to include a lower door-mounted latch 36' adapted to engage a striker (not shown) also mounted to lower rail 22. Door closure system 80 is shown to include a single body-mounted dual latch 90 adapted to accept and retain a first striker mounted to front door 12 and a second striker mounted to rear door 14. Latch 90 is mounted to upper rail 20 centrally to engage both strikers upon closing doors 12, 14.

Dual latch 90 is best shown in FIG. 6 to include a first ratchet and pawl latch set 94 and a second ratchet and pawl latch set 96. First set 94 includes a first ratchet 100 pivotal about a ratchet pivot 102 relative to a body-mounted latch housing 104 between a striker release position and a striker capture position relative to a striker guide channel 106 in housing 104 aligned to accept movement of the first striker 112 thereon. A first pawl 108 is pivotally coupled via a first pawl pivot 110 to housing 104 for movement between a ratchet checking position and a ratchet releasing position. In its ratchet checking position, pawl 108 holds first ratchet 100 in its striker capture position. A similar relationship is provided by second latch set 96, which is identified by "primed" reference numerals and is configured to release and retain the second striker 114 associated with rear door 14. First striker 112 of first door 12 is shown retained in guide slot 106 when front door 12 is closed and latched. Likewise, second striker 114 of rear door 14 is shown retained in guide slot 106 when rear door 14 is closed and latched. Dual latch 90 is further shown to include an actuator cam 120 pivotally mounted to housing 104 via pivot pin 122 and which can be rotated (mechanically or electrically) in a first or counter clockwise direction to release first latch set 94 or in a second counter clockwise direction to release second latch set 96. Actuation is caused by actuator cam 120 moving from its central non-actuated position shown into engagement with either of pawls 108, 108' to forcibly move it to its ratchet release position, thereby allowing ratchets 100, 100' to move to its striker release position.

Figure 7:
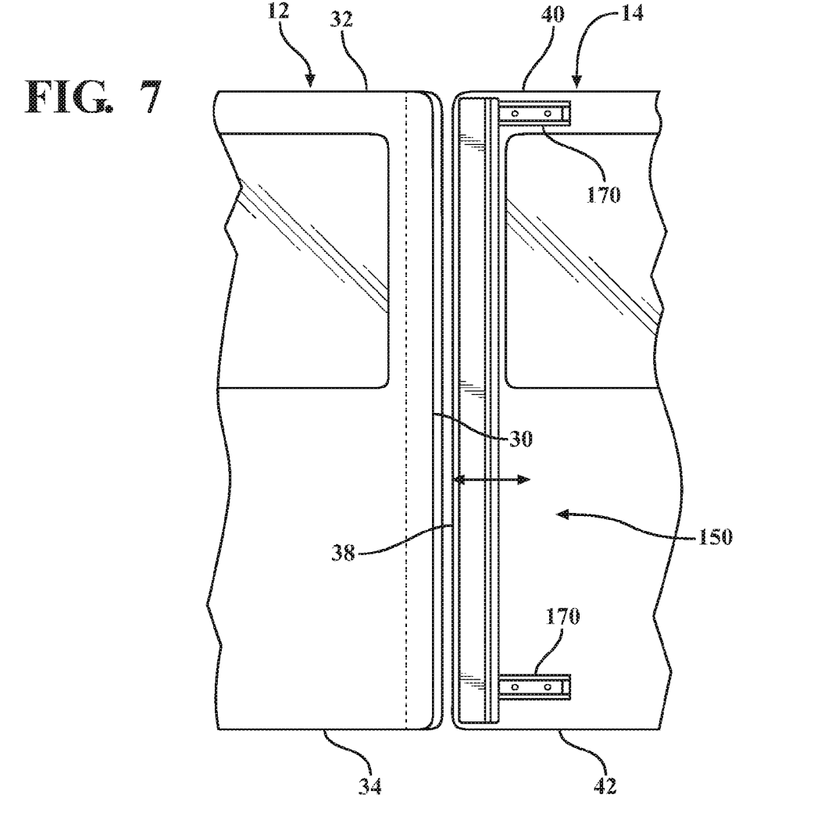
FIGS. 7 and 8 are side and top sectional views of a sealing arrangement well-suited for use with the two-door closure system of FIGS. 2-4.
Figure 8:
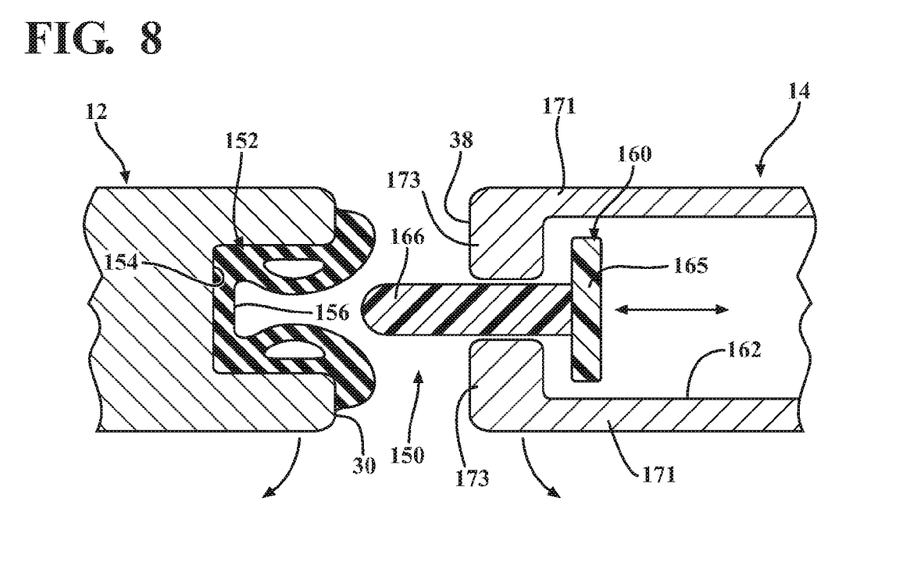

FIGS. 7 and 8 illustrate a sealing arrangement 150 associated with two-door closure system 24 of FIGS. 2-4. Here, a pocket seal 152 is installed in an end channel 154 formed in edge 30 of front door 12. Pocket seal 152 defines an elongated sealing channel 156. A moveable sealing panel 160 is positioned in a guide channel 162 formed in the forward sealing edge 38 of rear door 14 and has a base portion 165 and a seal rail 166, with the seal rail 166 extending transversely from the base portion 165. The seal rail 166 is configured to move in and out of engagement with sealing channel 156 in pocket seal 152. Seal rail 166 will slide forward and mate with channel 156 in pocket seal 152 when doors 12, 14 are closed. Sealing panel 160 can be moved between its extended position (seal rail 166 engaging seal channel 156 in pocket seal 152) and a retracted position (seal rail 166 released from seal channel 156), either mechanically or electrically, when a door handle is actuated. Movement of sealing panel 160 can be coordinated with release and latching of the door latches. Sealing panel 160 can be supported for translational movement on a pair of rails 170. As illustrated in FIG. 7, the rails 170 may be positioned in spaced and parallel relationship with one another, and extend perpendicularly to the forward edge 38 of the rear door 14. As illustrated in FIG. 8, the rails 170 may each extend along a linear portion 171 and terminate at a flange portion 173 that extends transversely to the linear portion 171. During sliding movement of the sealing panel 160, movement of the sealing panel 160 may be limited by the base portion 165 of the sealing panel 160 contacting the flange portion 173 of the rails 170.

Figure 9:
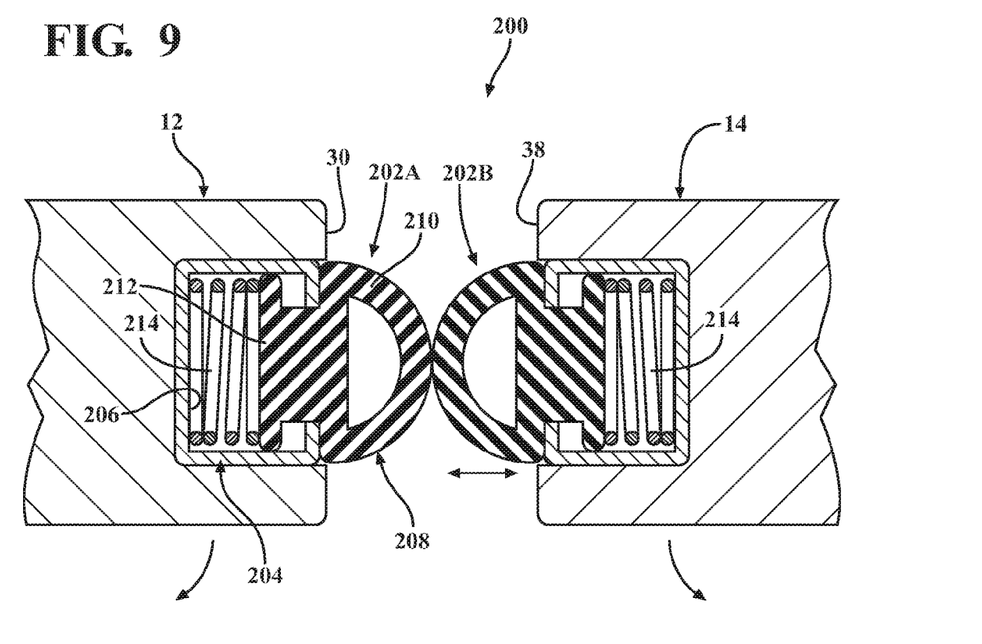
FIG. 9 is a top sectional view of a sealing arrangement well-suited for use with the two-door closure system shown in FIGS. 5 and 6.

FIG. 9 illustrates two-door closure system of FIGS. 5 and 6 with an edge sealing arrangement 200 having a pair of spring-loaded seal units 202A, 202B associated with facing edges 30, 38 of doors 12 and 14. Each sealing unit includes a rigid guide beam 204 defining a T-channel 206, a resilient (rubber) sealing member 208 having a cap segment 210 and a web segment 212 located in T-channel 206, and a spring 214 acting between guide beam 204 and web segment 212 of sealing member 208. One or both of seal units 202A, 202B can be spring-loaded via installation of spring 214 which normally biases sealing member 208 outwardly from guide beam 204.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A two-door closure system for a motor vehicle having a body having an A-pillar and a C-pillar being spaced from one another, the two-door closure system comprising:
   a front door having a front edge for being pivotably connected to the A-pillar of the vehicle body, and a rear edge positioned in spaced and generally parallel relationship with the front edge;
   a rear door having a rearward edge for being pivotably coupled to the C-pillar of the vehicle body, and a forward edge disposed in spaced and generally parallel relationship with the rearward edge, with a latch located proximate the rearward edge for releasably latching the rear door to the C-pillar; and
   at least one swivel hinge unit having a first pivot pin pivotably connected to the rearward edge of the rear door and a second pivot pin for being pivotably connected to the C-pillar of the vehicle body to allow the rear door to initially pivot and translate away from the front door prior to pivoting the rear door between an open and closed position about the second pivot pin.

2. A two-door closure system as set forth in claim 1 wherein the swivel hinge unit further includes a first pivot component fixed to the rearward edge of the rear door, and a second pivot component pivotably connected to the first pivot pin component with the first pivot pin, and wherein the second pivot pin is connected to the second pivot component in spaced relationship with the first pivot pin.

3. A two-door closure system as set forth in claim 2 wherein the second pivot component extends between a first terminal end and a second terminal end being spaced from one another, and wherein the first pivot pin extends through the second pivot component adjacent to the first terminal end and the second pivot pin extends through the second pivot component adjacent to the second terminal end.

4. A two-door closure system as set forth in claim 3 wherein the second pivot component has a symmetrical arc-shape between the first and second terminal ends.

5. A two-door closure system as set forth in claim 3 wherein the first pivot pin and the second pivot pin each extend generally parallel to the rearward edge of the rear door.

6. A two door closure system as set forth in claim 5 wherein the second pivot component extends generally perpendicularly to the first and second pivot pins.

7. A two door closure system as set forth in claim 1 wherein the at least one swivel hinge unit includes a pair of swivel hinge units positioned in spaced relationship with one another along the rearward edge of the rear door on opposite sides of the latch.

8. A two door closure system as set forth in claim 1 further including a pocket seal mounted to one of the front and rear doors; and a sealing panel mounted to the other of the front and rear doors and being moveable between a retracted position and an engaged position, wherein the sealing panel is spaced from the pocket seal when in the retracted position, and wherein the sealing panel is received by the pocket seal when in the engaged position, wherein the pocket seal defines an elongated, generally U-shaped sealing channel extending substantially along the entire length of one of the edges of the front or rear door, wherein the sealing panel is received by the elongated, generally U-shaped sealing channel when in the engaged position, and wherein the sealing panel is spaced from the elongated, generally U-shaped sealing channel when in the retracted position.

9. A two door closure system as set forth in claim 8 wherein the motor vehicle includes at least one door handle, and wherein the sealing panel is configured to move between the retracted and engaged positions in response to movement of the door handle.

10. A two door closure system as set forth in claim 8 wherein the sealing panel includes a base portion and a generally planar seal rail extending transversely from the base portion, and wherein the generally planar seal rail is received by the elongated, generally U-shaped sealing channel when the sealing panel is in the engaged position.

11. A two door closure system as set forth in claim 10 further including a pair of rails connected to at least one of the front and rear doors and extending generally perpendicularly to the edges of the front and rear doors; the base portion and at least part of the generally planar seal rail of the sealing panel being positioned between and supported for translation by the rails; and the sealing panel being linearly slideable between the rails between the extended position to translate the generally planar seal rail into the elongated, generally U-shaped sealing channel and retracted position to translate the generally planar seal rail outwardly from the elongated, generally U-shaped sealing channel.

12. A two-door closure system for a motor vehicle, the two-door closure system comprising:
an A-pillar and a C-pillar positioned in spaced and generally parallel relationship with one another;
a front door having a front edge pivotably connected to the A-pillar and a rear edge positioned in spaced and generally parallel relationship with the front edge; and
a rear door having a forward edge facing the rear edge of front door and a rearward edge pivotably coupled to the C-pillar and disposed in spaced and generally parallel relationship with the front edge, with a latch located proximate the rearward edge for releasably latching the rear door to the C-pillar;
wherein the rearward edge of the rear door is pivotably coupled to the C-pillar via at least one swivel hinge unit configured to initially pivot and translate the rear door away from the front door prior to pivoting the rear door between an open and closed position.

13. A two-door closure system as set forth in claim 12 wherein the swivel hinge unit includes a first pivot component that is fixed to the rearward edge of the rear door and a second pivot component that is pivotably connected to the first pivot component and pivotably connected to the C-pillar.

14. A two-door closure system as set forth in claim 13 wherein the second pivot component extends between a first terminal end and a second terminal end, and wherein the first pivot component is pivotably connected to the second pivot component adjacent to the first terminal end, and wherein the C-pillar is pivotably connected to the second pivot component adjacent to the second terminal end.

15. A two-door closure system for a motor vehicle having a body having an A-pillar and a C-pillar being spaced from one another, the two-door closure system comprising:
a front door having a front edge for being pivotably connected to the A-pillar of the vehicle body, and a rear edge positioned in spaced and generally parallel relationship with the front edge;
a rear door having a rearward edge for being pivotably coupled to the C-pillar of the vehicle body, and a forward edge positioned in spaced and generally parallel relationship with the forward edge; and
a pocket seal mounted to one of the rear edge of the front door and the forward edge of the rear door; and a sealing panel mounted to the other of the rear edge of the front door and the forward edge of the rear door and being moveable between a retracted position and an engaged position, wherein the sealing panel is spaced from the pocket seal when in the retracted position, and wherein the sealing panel is received by the pocket seal when in the engaged position, wherein the pocket seal defines an elongated, generally U-shaped sealing channel extending substantially along the entire length of one of the edges of the front or rear door, wherein the sealing panel is received by the elongated, generally U-shaped sealing channel when in the engaged position, and wherein the sealing panel is spaced from the elongated, generally U-shaped sealing channel when in the retracted position.

16. A two door closure system as set forth in claim 15 wherein the motor vehicle includes at least one door handle, and wherein the sealing panel is configured to move between the retracted and engaged positions in response to movement of the door handle.

17. A two door closure system as set forth in claim 15 wherein the sealing panel includes a base portion and a generally planar seal rail extending transversely from the base portion, and wherein the generally planar seal rail is received by the elongated, generally U-shaped sealing channel when the sealing panel is in the engaged position.

18. A two door closure system as set forth in claim 17 further including a pair of rails connected to at least one of the front and rear doors and extending generally perpendicularly to the edges of the front and rear doors; the base portion and at least part of the generally planar seal rail of the sealing panel are positioned between and supported for translation by the rails; and wherein the sealing panel is linearly slideable between the rails to the extended position to translate the generally planar seal rail into the elongated, generally U-shaped sealing channel and retracted position to translate the generally planar seal rail outwardly from the elongated, generally U-shaped sealing channel.

* * * * *